United States Patent [19]

Brooks

[11] E Re. 28,978

[45] Reissued Sept. 28, 1976

[54] FAIL-SAFE SUBSEA FLUID TRANSPORTATION SYSTEM

[75] Inventor: Warren B. Brooks, Darien, Conn.

[73] Assignee: Mobil Oil Corporation, New York, N.Y.

[22] Filed: Feb. 24, 1971

[21] Appl. No.: 118,251

Related U.S. Patent Documents

Reissue of:

[64] Patent No.: 3,454,083
Issued: July 8, 1969
Appl. No.: 649,935
Filed: June 29, 1967

[52] U.S. Cl. ..... 166/.5; 137/1
[51] Int. Cl.[2] ..... E21B 43/01; E21B 15/02
[58] Field of Search ..... 137/1, 15; 61/1, .5, 61/69; 166/.5; 114/.5 T

[56] References Cited

UNITED STATES PATENTS

| | | | |
|---|---|---|---|
| 2,783,970 | 3/1957 | Gillespie | 175/8 X |
| 3,292,695 | 12/1966 | Haeber | 166/.5 |
| 3,366,173 | 1/1968 | McIntosh | 166/.5 |
| 3,389,559 | 6/1968 | Logan | 61/1 |
| 3,408,971 | 11/1968 | Mott | 114/.5 |
| 3,548,605 | 12/1970 | Paull | 61/69 |
| 3,561,220 | 2/1971 | Riester | 61/34 |

*Primary Examiner*—Alan Cohan
*Attorney, Agent, or Firm*—C. A. Huggett; Drude Faulconer

[57] ABSTRACT

This specification discloses a subsea system for the production of fluid minerals. The system includes a product gathering network provided with production satellites in which the gas-oil-water ratios of each well are periodically tested and the flow rates are automatically controlled. A power distribution network connects a central power station, either floating or bottom supported, at the site or on land nearby, with the various satellite stations and submerged wellhead units. Provision is made for entry into the satellites and diver maintenance at the submerged wellheads. A rigid transportation pipe transports produced fluids to the water surface. At the lower end of the rigid transportation pipe is a designed break-away section which will be broken if excessive strain is encountered. An inverted funnel is located over the break-away section to trap any escaping fluid.

9 Claims, 3 Drawing Figures

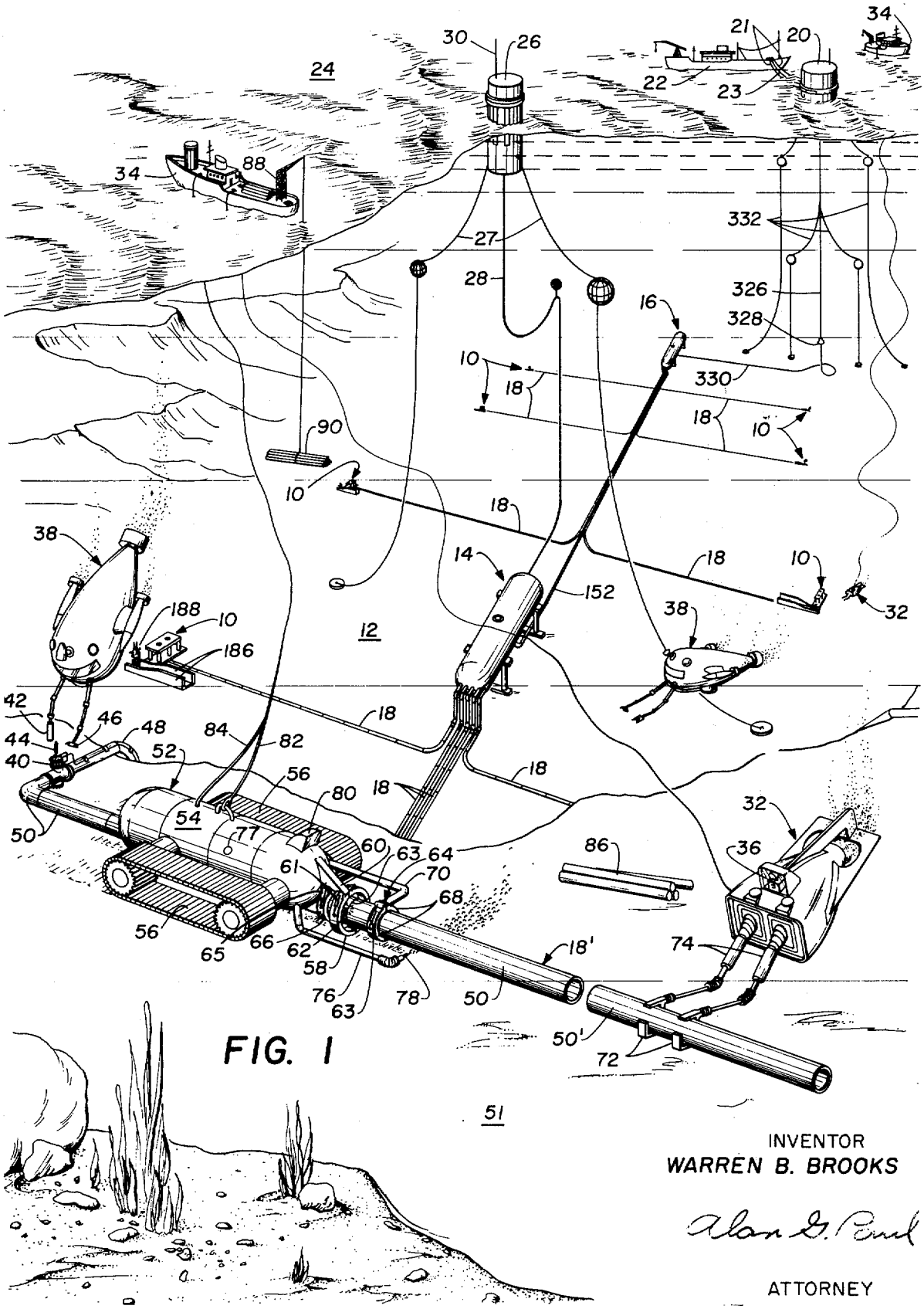
INVENTOR
WARREN B. BROOKS
Alan G. Pool
ATTORNEY

INVENTOR
WARREN B. BROOKS

Alan G. Pard

ATTORNEY

INVENTOR
WARREN B. BROOKS

Alan G. Kaul

ATTORNEY

FAIL-SAFE SUBSEA FLUID TRANSPORTATION SYSTEM

Matter enclosed in heavy brackets [ ] appears in the original patent but forms no part of this reissue specification; matter printed in italics indicates the additions made by reissue.

BACKGROUND OF THE INVENTION

Field of the Invention

This invention relates to a subsea system for the recovery of subaqueous deposits of fluid minerals. By the term "fluid" is meant any slurry of other state of matter which will pass through a conduit or pipe. More particularly, the invention relates to the production of gas and/or oil from subaqueous formations utilizing a system of submerged wellheads and a product gathering network in combination with submersible automated and/or semiautomated equipment.

Description of the Prior Art

Present developments in the offshore oil and gas industry indicate that production efforts will be extended, in the near future, to undersea areas, such as the outer fringes of the continental shelves and the continental slopes, where a submarine production system is believed to be the most practical method of reaching the subaqueous deposits. Although hydrocarbons are the main concern at this time, it is contemplated that subaqueous deposits of sulfur and other minerals will be produced from beneath the seas in a very few years. While bottom-supported permanent surface installations have proved to be economically and technologically feasible in comparatively shallow waters, it is believed that in the deeper waters of the continental shelves (over three hundred feet) and the continental slopes (depths over six hundred feet), the utilization of such surface installations must be limited to very special situations. Installations extending above the water surface are also disadvantageous even in shallower water where there are adverse surface conditions, such as in the Arctic areas where the bottom-supported structure of above-surface production platforms are subject to ice loading. The tides, which may run up to thirty feet in the northern latitudes, such as in Cook Inlet, Alaska, tend to lift the ice formed on the legs of the platform and tear the anchoring means therefor completely out of the sea bottom as well as driving broken-up sheet ice laterally against the platforms at six to eight knots or more. In some areas commercial shipping and pleasure boats present a constant source of danger to above-surface installations, while recreation and area beautification may provide man-made obstacles to their erection, particularly near seaside resort areas and seaport cities.

The sheltering of production equipment beneath the surface of the sea, while believed to be economically feasible at depths of over three hundred feet, even where adverse conditions are not present, still presents many technical problems, particularly with respect to the servicing and maintenance thereof. With a deep water subsea system, the majority of the maintenance and servicing problems encountered must be handled automatically, or at least by remote control, due to the cost and limitations on deep diving at the present time; however, there should be provisions for having divers at the scene of installed subsea equipment in the event that the necessary manipulations are too complicated for anything but direct human control. The use of submersible vehicles, with articulated manipulators, for performing a variety of subsea operations has been generally proven and such vehicles can fill much of the gap between completely automated equipment and operations that must be performed by divers.

SUMMARY OF THE INVENTION

The present invention provides a fail-safe system for transporting fluid minerals underlying a body of water to a surface station. The system includes a rigid fluid transportation pipe which extends from the water surface and terminates in an inverted funnel near the water bottom. A conduit connected to a source of produced fluids is adapted to direct the fluids into the lower end of the rigid pipe. A portion of the conduit means within the inverted funnel includes a designed break-away section which will be broken if excessive strain is encountered. The inverted funnel will trap an escaping fluid and thus fluid lost will be kept to a minimum.

The present invention may be included in a subsea production system including satellite gathering stations for testing the produced effluent from submerged wellheads of spaced subaqueous wells whose products are directed therethrough, and in response, controlling the well-head valves of the respective subaqueous wells. While the satellite stations are designed for automatic and/or remote operation, there are provided means for the safe entry of personnel for maintenance and repair. Furthermore, the satellite stations are each constructed so as to prevent pernicious vapors leaking from the production equipment from contaminating the life support sections of a satellite station.

BRIEF DESCRIPTION OF THE DRAWINGS

FIG. 1 is a pictorial representation of a portion of a subsea producing system in accordance with this invention;

DESCRIPTION OF SPECIFIC EMBODIMENTS

Figure 1A:
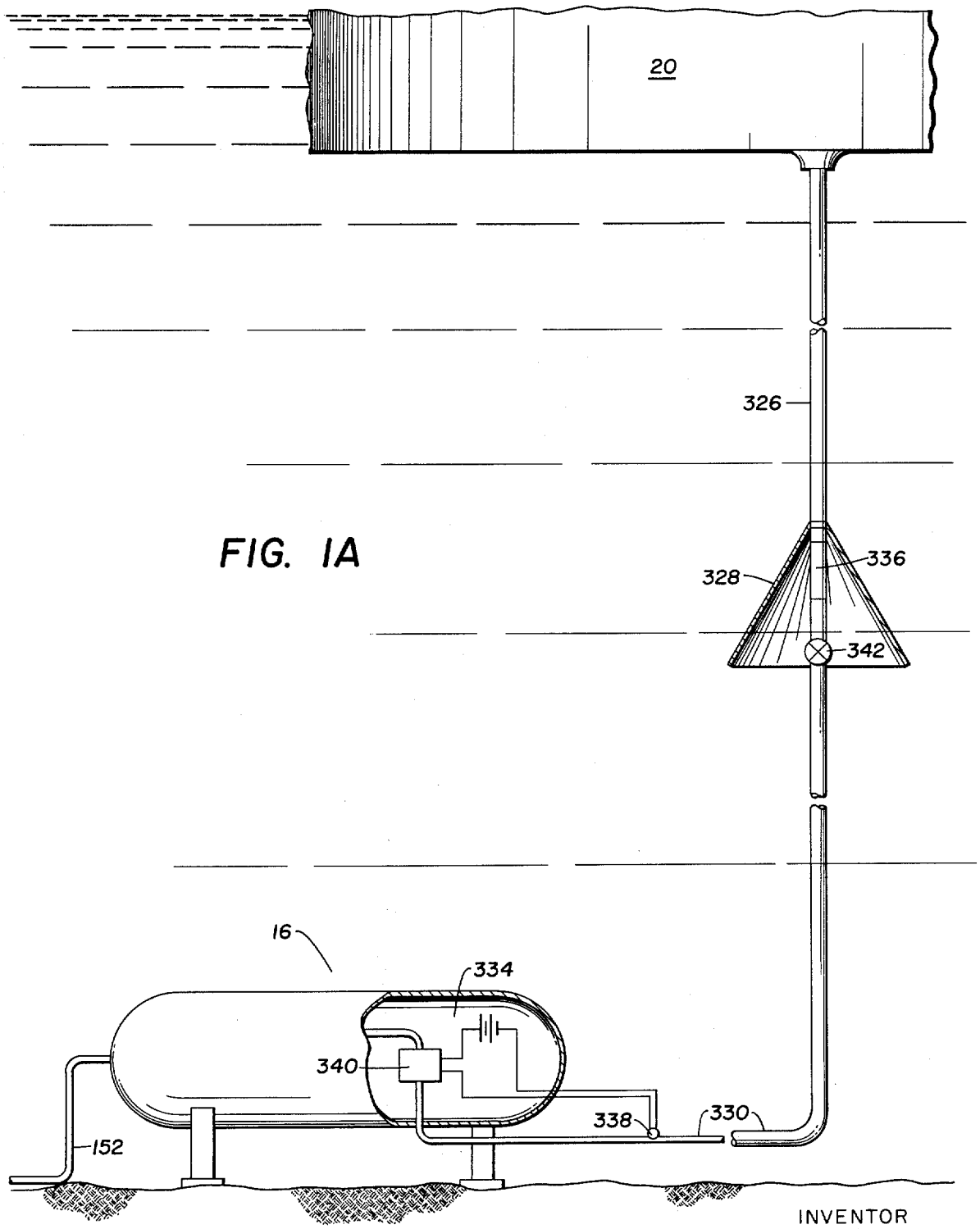
FIG. 1A is an elevational view, partially in schematic and partially in cross section, of a system for transporting the produced fluids from a subsea satellite pumping station to a floating storage tank.

Now referring to FIG. 1, there is shown a subsea production system in operation in the background and a continuation of the flowlines therefrom being installed on the ocean bottom in the foreground. Submerged production oil and/or gas wellhead units, generally designated 10, on the marine bottom 12 are connected into the subsea system through satellite stations, generally designated 14 and 16, by means of flowlines 18. The satellite station 14 functions as a production gathering point, information center, and automatic control center for its associated wells, while the satellite station 16 provides all of the functions of the station 14 while also having added pumping facilities for forcing the produced hydrocarbons to a floating storage tank 20. The stored hydrocarbons are removed from the floating storage tank 20 by a tanker 22, floating on the water surface 24, which visits the storage tank 20 and is moored thereto at prescribed intervals.

As shown, the tanker 22 is located with respect to the storage tank by mooring lines 21 while onloading through a floating hose 23 connected to an outlet of the storage tank 20. A floating central control and power generating station 26 is moored above the subaqueous producing field by lines 27 and is connected to the satellite 14 by a bundle of electrical lines 28 for information input and retrieval, command signals, and the supplying of electrical power to the subsea system. It is contemplated that personnel would live on the station 26 to supervise continuously the operation of the subsea production system. Electric power is distributed, along the marine bottom 12, to the various wellhead units 10 shown, the satellite station 16, and other satellite stations 14 from the illustrated satellite station 14.

Although the central control and power generating station 26 is illustrated as floating on the surface of the body of water just above the subsea production system, depending upon the distance from shore, the floating station 26 could be dispensed with entirely and the electrical power lines as well as the information input and retrievel and command signal lines could be laid across the ocean bottom to an onshore station. Another possibility is that the floating station 26, while having the equipment for generating power built thereon, would be merely a link between the submerged satellite 14 and a station ashore for the transmission of information to and from shore and command signals to the satellite through the illustrated antenna 30. A microwave relay system, of the type now utilized in conjunction with same platform-produced fields in the Gulf of Mexico, would be acceptable for this purpose.

Various valves and controls situated at the wellhead units 10 would normally be controlled by interconnecting hydraulic or electrical lines from within the satellites 14 and 16. However, if there should be a breakdown in communication between a wellhead unit 10 and its respective controlling satellite 14 or 16, articulated armed robot submersible vehicles, generally designated 32 (the nearer one shown handling pipe), remotely controlled from surface vessels 34, would be utilized. Such vehicles, directed by the aid of remote viewers such as television cameras 36 in clear water, or sonic or laser viewers in murky water, mounted thereon, would be much less expensive than a manned vehicle with its attendant life support systems. However, in instances where direct observation is necessary, submersible vehicles having articulated manipulators, such as the illustrated submersible vehicles, generally designated 38, are useful; the vehicle 38 at the right is observing a pipe-laying operation, while the vehicle 38 at the left is about to operate a flowline valve 40 by the use of a rotary actuator tool 42 adapted to fit an upwardly extending nut 44 forming the valve actuator. A tool, such as the rotary tool 42, as well as a number of other tools to be used in conjunction with the articulated manipulators of submersible vehicles are pictured on pp. 653–661 of the book, Proceedings of OECON-Offshore Exploration Conference, 1966, published by M. J. Richardson Inc., 2516 Via Tejon, Palos Verdes Estates, Calif. The other articulated manipulator terminates in a plate like tool 46 used as a reaction member to prevent the vehicle 38 from turning rather than the valve actuator nut 44. The valve 40 would normally be controlled from a satellite station 14, 16 through the control line 48 strapped thereto. Along the outer shell of the submersible vehicles 38 are pockets or hooks (not shown) for carrying as many different tools as may be necessary. By using one of the many known quick release couplings, an articulated manipulator can easily be released from a first tool connected to the outer end thereof and to a second tool fixed thereon. As will be explained later, a similar manned submersible vehicle can also be utilized as a rest station for divers working at a nearby wellhead unit 10 or other equipment.

Individual wellhead units 10, as well as the satellite stations 14 and 16, can be installed at the proposed location without the need for divers. It is now well within the skill of the art to remotely locate equipment on the marine bottom 12, in the proper orientation, and secure it in place. One of the major problems remaining, however, is that of connecting the individual production units of the subsea system together. As shown in the foreground of FIG. 1, sections of pipe 50 of a flowline 18′, to be connected between the illustrated satellite 14 and a wellhead unit 10 off to the right of the drawing in the foreground, are being installed on a shelf 51 of the marine bottom 12 by the use of one of the unmanned remotely controlled articulated submersible vehicles 32 and a robot welder, generally designated 52.

The robot welder 52 comprises a tanklike body 54 supported above the path of the flowline 18′, being installed, on a pair of opposed endless treads 56 driven by a motor and transmission means (not shown) within the tank 54. The robot welder 52 would normally be supported on the marine bottom 12 by the treads 56, but in areas where bottom sediments woud not support the weight of the robot welder 52, buoyancy chambers would be built into the tanklike body 54.

Extending out ahead of the tank 54 is a welding ring 58 which encircles the flowline 18′ and is held in a vertical position by a strut 60 extending out from the front of the tanklike body 54. A welding head 62 is contained on a track (not shown) around the inside face of the welding ring 58 so that a welding bead is formed which completely encircles a joint 63 between abutting sections of pipe 50. The welding ring 58 is formed of a pair of semicircular members pivoted about the point of connection with the strut 60. A hydraulic piston cylinder 61, connected between a point on each semicircular member of the welding ring 58 and the pivot point to control the opening and closing of the welding ring 58. The ability of the welding ring to open permits the robot welder to mount a flowline 18 intermediate the ends thereof. A pair of aligned pipe clamps 64 and 66 hold the abutting ends of adjacent sections of pipe 50 together and in alignment prior to and during the welding operation. The pipe gripping portion of clamp 64 and a pair of semicircular jaws 68 are actuated by extensible struts having hydraulic piston-cylinder arrangements 63 connected between each of the jaws 68 and an outwardly extending anchoring arm 70 from which the jaws 68 pivot. The jaws of the clamp 66 are pivoted from the underside of the strut under the control of extensible struts 65. With the jaws of the clamps 64 and 66 reopening, the robot welder 52 can move up the flowline 18′ to the next point at which a weld is needed. The closing of the clamp 66 aligns the end of the last pipe section 50 of the flowline 18′ and the welding ring 58. The still opened jaws 68 of the clamp 64 permit the remotely controlled submersible vehicle 32 (in the right foreground) to slide a new pipe section 50′ into the jaws 68 of the clamp 64 by means of the hand or vice-type extension tools 72 at the ends of its articulated manipulators 74. A pile 86 of pipe sections is stacked on the shelf 51 just behind the flowline 18' being fabricated. When the remotely controlled submersible vehicle 32 delivers a pipe section 50', that it is carrying, to the robot welder 52, it is sent back to pick up another pipe section 50' from the pile 86. The vessel 34 from which the remotely controlled submersible vehicle 32 and welder 52 are both controlled has a crane 88 capable of lowering further stacks 90 of pipe sections 50 down to the flowline 18' being fabricated.

In connecting two of the subsea producing units with a flowline, it is advantageous to use a collet connector (not shown) at each fixed unit since the robot welder 52 is not suited to forming any but abutting welds between pipe sections of substantially equal diameters. To start the flowline, a first pipe section is transported by the submersible vehicle 32 to the fixed producing unit from which the flowline is to be started. The end of a pipe section is inserted into a collet connector forming the outer portion of a port in the unit. The collet connector is actuated to lock the pipe section in place from a central facility, or a surface vessel, or from the submersible vehicle. The robot welder 52 is then lowered onto the pipe section 50', forming the beginning of a flowline with both sets of pipe clamps 64 and 66 as well as the welding ring 58 held open. When the welder 52 has settled down on the unfinished flowline, the welding ring 58 may be closed and is not again opened until the flowline is completed. Sections of pipe are added to the flowline and welded in place as discussed above. As the flowline reaches a point at which it is only one pipe section or less from the second producing unit, a measured pipe section is brought up which will lock in a collet connector terminating a port in the second unit while abutting the last pipe section of the unfinished flowline. The last joint is then welded between the measured pipe section and the unfinished flowline after which the clamps 64 and 66 as well as the welding ring 58 are all opened permitting the robot welder 52 to be lifted off the pipeline 18'. At this time the collet connector on the second producing unit is actuated to complete the flowline.

Once the pipe section 50' has been inserted into the enlarged opening through the clamp 64 and the new section of pipe 50' abuts tightly against the last welded-on section 50, the jaws 68 of the clamp 64 are closed, aligning the pipe sections 50 and 50' in abutting relationship. The traveling welding head 62 is then driven around the track within the ring 58 to form a circumferential bead around the joint after which both of the clamps 64, 66 are opened. The robot welder 52 then moves on up the flowline to the new outer end of the flowline 18', one pipe section 50 away, and the sequence of operations is repeated. Since the pipe sections 50 tend to sink into the mud on the marine bottom 62, a means must be provided for forming a temporary path under the flowline 18' so as not to hinder the movement of the clamps 64, 66 and the ring 58 as the welder 52 moves forward. A shallow trench is formed ahead of the robot welder 52 by a jet pipe 76 extending out parallel to the flowline 18'. The tip 78 of the jet pipe 76 is aimed to project fluid under pressure transversely toward, and down slightly below, the flowline 18'. The preferred method is to provide a pump (not shown) with the body 54 to pick up sea water through an intake port and drive the water out through the jet pipe 76. A television camera 80 (or any other type of remote viewer is previously discussed) is mounted on top and at the front of the tanklike body 54 of the robot welder 52 so that the welding operations can be observed from the ship 34 (at the left-hand side of the drawing) at the surface. The ship 34 and the robot welder 52 are connected by a hoisting line 82, and a control cable 84 through which the television signals are sent to the ship 34 and commands are transmitted to the welder 52 from the ship. Within the tanklike body 54 is the various equipment for directly controlling the movement of the robot welder 52.

Figure 2:
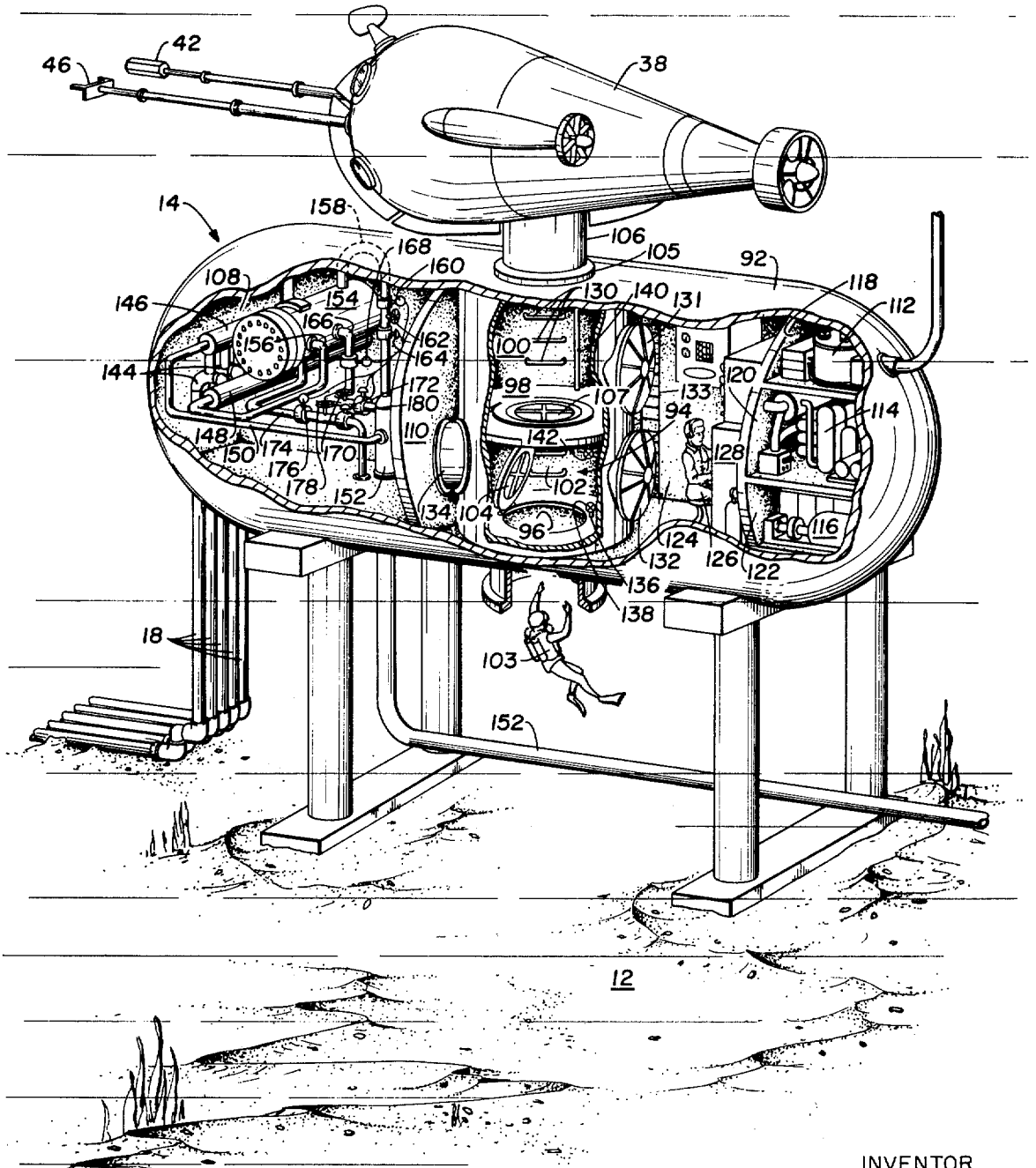
FIG. 2 is an elevational view, partially broken away, of a subsea satellite station forming a portion of the subsea producing system of the present invention.

Now looking to FIG. 2, the satellite station 14 has a hollow shell 92 comprising a cylindrical center section closed by hemispherical end sections and is divided interiorly into three airtight chambers. A central access chamber, generally designated 94, provides an entrance into the satellite station 14 from one of the submersible vehicles 38 from above, or by a diver, through a lock 96 below. The access chamber 94 is cylindrical in shape and is divided vertically, by an intermediate lock 98, into an upper compartment 100 through which personnel move between the interior of the satellite station 14 and the submersible vehicle 38 and a lower compartment 102 through which a diver 103 enters and leaves the satellite station 14. Since the satellite station 14 would normally be maintained at atmospheric pressure, sealable hatches 104 and 107 are necessary at the lower and intermediate locks 96 and 98, respectively. An upper lock 105 is also sealed (by a nonillustrated hatch) when no submersible vehicle 38 is engaged thereto by a depending intermediate access tube 106. The submersible vehicle 38 also operates at atmospheric pressure normally, but an internal compartment therein, connected by the access tube 106 to the upper lock 105 of the satellite station 14, as well as the entire central access chamber 94, can be pressured up to accommodate divers who have worked in the open sea and require decompression. The divers in the pressurized compartment in the submersible vehicle 38 are transported to a surface ship where there are proper facilities for safe decompression.

All of the hydrocarbon products being produced through the satellite station 14 are confined to a processing chamber 108, at one end of the satellite shell 92, walled off by a bulkhead 110, to prevent contamination of the atmosphere in the remainder satellite station 14 if there should be a leak in the processing equipment. The air purification equipment 112, pumping equipment 114, and electrical power facilities 116 are in separate sealed compartments 118 to 122, respectively, of a control chamber 124 at the other end of the satellite station 14 from the hydrocarbon processing equipment. An operator 126, shown sitting at a control console 128 in the control chamber 124, can monitor and direct the equipment in the hydrocarbon chamber 108 as well as actuating valves at the wellhead units 10 and flowlines 18.

Both the upper and lower compartments 100, 102 of the access chamber 94 are normally closed to the sea and are held at atmospheric pressure. After the access tube 106, depending from under the submersible vehicle 38, makes contact with the lock 105 on the upper end of the satellite station 14, the two are sealably connected and any water in the access tube 106 is pumped out by equipment on the submersible vehicle 38. With an equalization of pressure, the hatch in the lock 105 is opened. Personnel can then enter the upper compartment 100 of the satellite station 14 directly from the submersible vehicle 38, through the access tube 106 at atmospheric conditions. Personnel from the submersible vehicle 38 come down rungs 130, fastened to the interior wall of the access chamber 94 to form a ladder, and enter the control chamber 124 through a safety airlock 131 and a ladder 133.

If the services of a diver are necessary, scuba or "hard hat" diving equipment, stored in the chamber 124, are utilized. Once the diving equipment is donned, the diver 103 enters the lower compartment 102, through a safety airlock 132, reseals the safety airlock 132 and makes sure the intermediate lock 142 is sealed, and then floods the lower compartment 102. As the lower compartment 102 fills with water, the diver 103 opens the lower lock 96 and descends into the water. If the job to be performed takes an extended time at depths of more than several hundred feet, the diver 103 may be limited to as short a working time as one-half hour before he must come back to the satellite station 14 to rest. In such a case, more than one diver 103 could be used, the remaining members of the working team resting in the atmospheric portions of the satellite station 14 while one of the team works in the water and each one exiting in turn through the lower lock 96 when the last one returns to the satellite station. In such a manner, work can continue over long periods of time although any one diver 103 cannot stay very long in the hostile environment.

When performing maintenance or inspection work in the processing chamber 108, the possibility of a gas leak in the equipment is checked by a workman donning life support gear such as scuba apparatus entering the chamber 108 with a hand-carried device for detecting toxic, pernicious gases that might be leaking from the processing equipment. Alternatively, a leak detector is mounted in the bulkhead 110 to sample the atmosphere within the compartment 108 while providing a visual indication to one either within the access chamber 94 or the control chamber 124. If possible the leak is stopped by shutting off the processing equipment from within the control chamber 124. The processing chamber 108 is then flooded while exhausting the contaminated atmosphere to the surrounding water. After re-establishing atmospheric conditions in the processing chamber 108, the atmosphere within the processing chamber is again checked, and if it is safe a workman can enter to make repairs. If the leak cannot be stopped in this manner, it will be necessary for a workman, wearing life support gear, to enter the contaminated processing chamber 108 to manually stop the leak. In the event that gas is escaping into the processing chamber 108 at a high pressure, too high a pressure for a man to exhaust through his breathing equipment into the processing chamber 108, an exhaust tube (not shown) would be connected from the life support gear back into the control chamber 124.

It is important to contain the contaminated atmosphere in the processing and access chambers 108, 94. By sealing the safety airlock 132 and the intermediate lock 98 from within the access chamber 94 before opening a safety lock 134, interconnecting the access chamber 94 within the processing chamber 108, the noxious fumes can be contained in the lower compartment 102 of the access chamber 94 and the processing chamber 108. After the maintenance or repair work is completed, the contaminated atmosphere within the processing chamber 108 and the access chamber 94 can be purged, by several alternate procedures. One way is to let in water under full pressure to displace the contaminated air through a line 136 by a hand-actuated control valve 138 in the lower compartment 102. The contaminated air in the lower compartment 102 of the access chamber 94 and the processing chamber 108 would then be forced out through a line 140 controlled by hand-actuated valve 142 also in the lower compartment 102. After the compartment 102 and the processing chamber 108 have been purged of the contaminated atmosphere therein by sea water, the valve 142 is closed and the sea water is pumped out through line 136 while air under atmospheric pressure is introduced. The water can also be expelled, through the line 136 without directly pumping it out by fresh air that is pumped in under pressure from the control chamber 124. Once all of the water has been expelled and the air pressure in the lower compartment 102 is brought back to atmospheric, the safety airlock 132 is reopened to allow the workmen to re-enter the control chamber 124. There would normally be no decompression problems associated with forcing out the contaminated air with ambient pressure sea water as long as the high pressure was not held for more than a few minutes.

Whenever a man is exposed to high pressures, even for a short time, there is some risk. So, for maximum safety, it is preferred that the contaminated air be evacuated into the surrounding water through the line 140 with the help of a pump (not shown) in the line. The water would be again brought in through the line 136. A pressure regulator (not shown) should be included in the line 136 to prevent the water pressure inside the satellite shell 92 from rising much above atmospheric. After all of the contaminated atmosphere has been displaced, the water is pumped out as described above while air under atmospheric pressure is reintroduced. At this time the equipment is rechecked for leaks.

In the instance where there was a very high pressure leak into the chamber 108, it would be dangerous for a man even to enter the chamber 108 with any portion of his body uncovered since the contaminated atmosphere therein could dissolve human skin. In fact, a gas such as methane would pass right through flesh, into the body fluids, altering the body chemistry and killing the man exposed to these conditions. Workmen would either have to wear completely protective clothing or the chamber 108 would have to be flooded prior to being entered and the workman would then preferably work in the chamber 108 under water. Very few materials possess the ability to withstand the onslaught of the high pressure gas and yet have the flexibility necessary for a protective garment. If the leak can be remotely stopped the diver would work under water at atmospheric pressure. If it is not possible to stop the leak prior to the workman entering the processing chamber 108 the diver-workman and work at ambient water pressure.

If the diver-workman must work for a considerable time at ambient pressure, he must be transported to a decompression chamber on an attending surface vessel (not shown) after the repairs are completed. After the repairs are completed in the flooded processing chamber 108, the workman enters the compartment 102, seals the safety lock 134, and has the water therein pumped out. A breathable atmosphere is pumped into the compartment 102 at ambient pressure. This can be done easily by opening the valve 138, or the port 96, while pumping high pressure air into the lower compartment 102 to drive the water out. The upper compartment 100 is also pressurized. When all the water is evacuated from the lower compartment 102, the valve 138 or port 96, whichever was opened, is closed and the intermediate lock 98 is opened. The workman can now enter the pressurized compartment in the submersible vehicle 38 for transportation to the decompression chamber on the surface vessel without passing through an area of low pressure. Before a second repairman can enter the processing chamber 108 to check on the repair work, the pressure in the upper and lower compartments 100, 102 must be pumped down to atmospheric while the water in the chamber 108 is pumped out and replaced with air at atmospheric pressure so that leaks can be checked for at atmospheric conditions.

The flowlines 18, extending into the satellite station 14 at the end at which the processing chamber 108 is located, are each operatively connected by two-position threeway valves 144 to either a group manifold 146 or a test manifold 148. In turn, each one of the flowlines 18 is separately connected to the test manifold 148 while the remainder are connected to the group manifold 146. From the group manifold 146 the effluent, flowing through all but one of the lines 18, is conducted, through a main conduit 150, to a main outlet line 152 which in turn depends through the shell 92 of the satellite station 14 and extends across the marine bottom 12 to the pumping station in the satellite station 14 and therethrough to the floating storage tank 20. The effluent, from a single flowline 18 at a time, is directed into the test manifold 148 and therethrough into a test separator 154, through an inlet line 156. The separated-out gas leaves the separator 154 through an outlet line 158 and is injected back into the main effluent stream at the main outlet line 152. A meter 160 in the gas outlet line 158 provides a means for indicating the amount of gas flowing through the line 158. Also in the outlet line 158 is a manual shut-off valve 162 and an automatic valve 164 which is controlled by equipment from within the control chamber 124 of the satellite station 14 for increasing or decreasing the back pressure on the separator 154. An oil outlet line 166 also extends from the test separator 154 to the main outlet line 152. The oil outlet line 166 also has a meter 168, a manual shut-off valve 170, and an automatic valve 172. A dump line 174 is either connected directly between the sump of the separator 154 and the water outside the satellite station 14, for ridding the effluent of water separated out in the separator 154, or if the pressure in the separator is too low this waste liquid may have to be pumped out. Line 174 also includes a meter 176, a manual shut-off valve 178, and an automatic valve 180. An automatic satellite gathering and test system, of the type discussed above, has been explained in detail in the A. E. Barroll et al. Patent No. 3,095,889, issued July 2, 1963.

In accordance with the present invention, the floating storage tank 20 is connected to the satellite station 16 by a fluid transportation path, as shown in FIGS. 1 and 1A, to comprise a rigid transportation pipe 326 depending to a point just above the marine bottom 12 and terminating in a funnel 328, and a flexible line 330 extending from the funnel 328 to the pumping section 334 (illustrated schematically in FIG. 1A) in the satellite station 16. A short section 336 of the flexible line 330, at the end of the line connected to the rigid transportation pipe 326 within the funnel, is of a weaker material or of the same material as the rest of the line 330, but has a thinner wall. By this arrangement, if the floating storage tank 20 shoud break its moorings and float away, the interconnecting fluid transportation path would tend to rupture, at its weakest point, the short section 336, in the flexible line 330 within the funnel 328. This would permit most of the fluid products to be saved and only the small amount in the flexible line [328] *330* at the time to be lost. The fluid products in the rigid pipe 326 at the time of the rupture would be driven up into the storage tank 20 by the hydrostatic pressure. A pressure actuated switch 338 is included in the flexible line 330 to open the electrical circuit supplying power to a pump 340 in the pumping section 334 in satellite station 16 if the flexible line [328] *330* were to rupture. Such a switch would be actuated by abnormally high or lower pressure, depending on the water depth and the pump outlet pressure. It is also advisable to mount a pressure controlled valve 342 in the outer end of the flexible line 330, just below the designed rupture portion to retain the fluid products in the flexible line [328] *330* subsequent to any rupture. Furthermore, the storage tank 20 is moored as far to the side of the subsea field as possible (FIG. 1) so that if it should break loose, its mooring lines 332, extending to the marine bottom 12, would not snag in the subsea equipment.

*To better understand the present invention, further discussion of the operation thereof would be beneficial. Under normal conditions, fluid products will be pumped by pump 340 within satellite station 16 up through line 330, short section 336, and pipe 326 into storage tank 20. However, if rough seas or the like cause tank 20 to strain against or break its mooring lines 332 (see FIG. 1), excessive forces will be applied to the fluid transmission path. If the fluid transmission path ruptures or breaks, it will do so at its weakest link which, as explained above, is short section 336. As section 336 cracks or breaks, fluid products being pumped through said path will begin to leak or escape out of the fluid transmission path at that point where the breaks in section 336 occur. Since this point is within inverted funnel 328, the fluid products (oil and/or gas) flowing out of the break will flow in under funnel 328 which surrounds the break. Funnel 328 will continue to overlie the break in section 336 until tank 20 has moved at least a distance equal to the radius of funnel 328 (this movement will obviously not be instantaneous) or until section 336 has completely sheared and line 330 has moved from within funnel 328. By the time either of the above occurs, both pressure actuated switch 338 and pressure controlled valve 342 will have responded to the change in the normal flow pressure in the flow transportation path caused by the break or crack in section 336. This pressure response will stop pump 340 so no more fluid products will be pumped through line 330 and will close valve 342 so that those products still within line 330 will not flow therefrom. Substantially all of the products which do escape from the break before valve 342 is closed will be trapped by the inverted funnel 328 and will be forced by the hydrostatic pressure of the water upward through pipe 326 to tank 20.*

Although the present invention has been described in connection with details of the specific embodiments thereof, it is to be understood that such details are not intended to limit the scope of the invention. Each of the described units of the subsea system previously discussed could conceivably be utilized without each and every one of the other units. For example, the satellite station 14 could be used without the particular robot wireline unit 182 or the robot welder 52. The terms and expressions employed are intended to be used in a descriptive sense only and there is no intention of excluding such equivalents in the invention described as fall within the scope of the claims. Now having described the subsea system herein disclosed, reference should be had to the claims which follow.

What is claimed is:

1. A fluid transportation path for conveying fluids upward through a body of water, comprising: a rigid fluid transportation pipe adapted to be substantially vertically located in a body of water, said rigid transportation pipe adapted to terminate at a first end thereof, above the surface of the body of water, said rigid transportation pipe adapted to terminate at a second end thereof, far beneath the surface of a body of water, in an inverted funnel, conduit means adapted to direct fluid into said second end of said rigid transportation pipe from a source of fluid, far beneath the surface of a body of water, a section of said conduit means within said inverted funnel being the weakest point in said fluid transportation path whereby, if a rupture should occur in said fluid transportation path, it would occur within said funnel and a minimum amount of produced fluid would be lost into the surrounding body of water.

2. A fluid transportation path for conveying fluids upward through a body of water as recited in claim 1 wherein said conduit means adapted to direct fluid into said second end of said rigid transportation pipe from a source of fluid beneath the surface of a body of water is a flexible transportation line connected to said rigid transportation pipe within said inverted funnel.

3. A fluid transportation path for conveying fluids upward through a body of water as recited in claim 2 wherein said rigid transportation pipe terminates at the first end thereof in a fluid storage tank adapted to float at the surface of a body of water.

4. A fluid transportation path for conveying fluids upward through a body of water as recited in claim 3 wherein there are means for mooring a tanker to said storage tank and means for offloading stored fluids from said storage tank into said tanker.

5. A subsea system for the production of fluid minerals from subaqueous deposits through wells having wellheads located beneath the surface of a body of water, comprising: a plurality of underwater wellhead units, each of said wellheads of said wellhead units being equipped with at least one remotely actuatable valve for controlling the flow of produced fluid from the respective well; at least one production satellite station located beneath the surface of said body of water; flowlines supported over at least a portion of their lengths on said marine bottom, connecting each of said plurality of underwater wellheads, through the respective remotely actuatable wellhead valve, with the interior of said satellite station; means within said satellite station for combining the produced fluid from all of said wells flowing through said flowlines and directing said produced fluid through a main outlet line; means within said satellite station for selectively testing said produced fluid flowing through each of said flowlines individually; means for actuating said remotely actuatable wellhead valves in response to the results of the selective testing of the produced fluid flowing through said flowlines to optimize production; and fluid pump means connected between said main outlet line, a fluid transportation path extending to a storage tank on the surface of the body of water for storing the fluid minerals produced in said subsea system; said fluid transportation path having a rigid fluid transportation pipe depending substantially vertically from said storage tank and terminating just above said marine bottom in an inverted funnel and a flexible transportation line extending between said funnel and the outlet of said pump means; and a section of said flexible transportation line, within said funnel, being the weakest point in said fluid transportation path whereby, if a rupture should occur in said fluid transportation path, it would occur within said funnel and a minimum amount of produced fluid would be lost into the surrounding body of water.

6. In the subsea production system of claim 5, pressure actuated switch means for shutting off said pump means in response to abnormal pressures in said fluid transportation path indicating a rupture in said fluid transportation path.

*7. A method of recovering a fluid such as oil or the like escaping from a crack in a flowline or the like submerged in a body of water, the method comprising:*

*locating a fluid containing container over and adjacent said crack;*

*passing at least some of the fluid trapped within said container upwardly through a conduit to the surface of the water; and*

*disposing of the fluid at the surface of the water.*

*8. A system for recovering a fluid such as oil or the like from a leaking underwater source comprising:*

*a chamber completely submerged in the water and positioned adjacent to and over the leaking source, said chamber being open at its lower end;*

*a conduit in fluid communication with the interior of said chamber and extending to a position adjacent the surface of the water; and*

*means attached to said conduit at said position adjacent said surface of said water for disposing of any leaking fluid which passes through said conduit.*

*9. The system of claim 8 wherein said means for disposing of said fluid comprises:*

*a floating storage means.*

* * * * *